W. V. TURNER.
TRIP VALVE DEVICE FOR AIR BRAKES.
APPLICATION FILED MAY 7, 1915.
1,218,721. Patented Mar. 13, 1917.
2 SHEETS—SHEET 1.
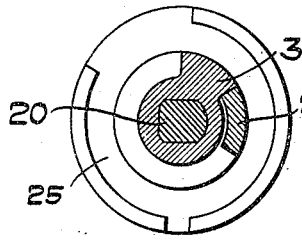
-FIG. 4.-
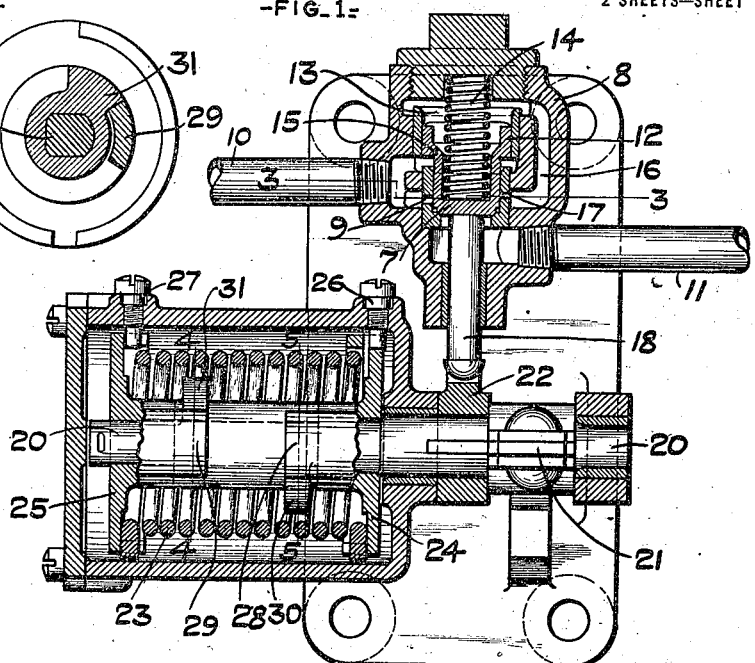
-FIG. 1.-
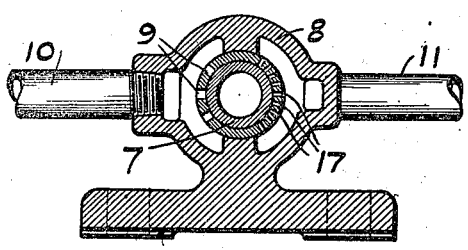
-FIG. 3.-
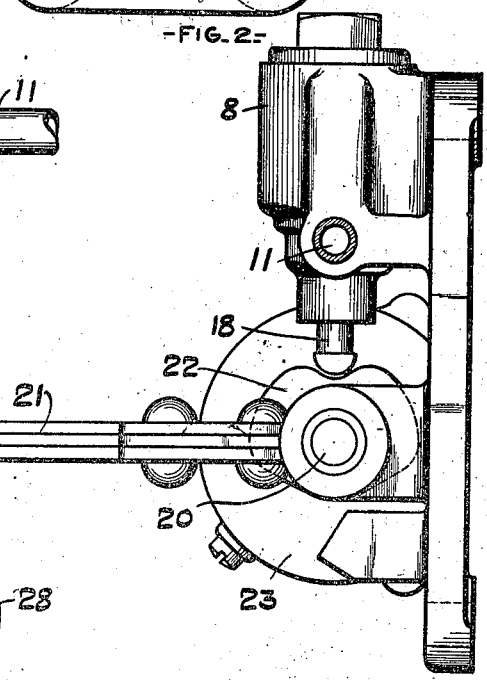
-FIG. 2.-
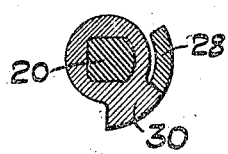
-FIG. 5.-
INVENTOR
Walter V. Turner
by Edward H. Wright
Atty

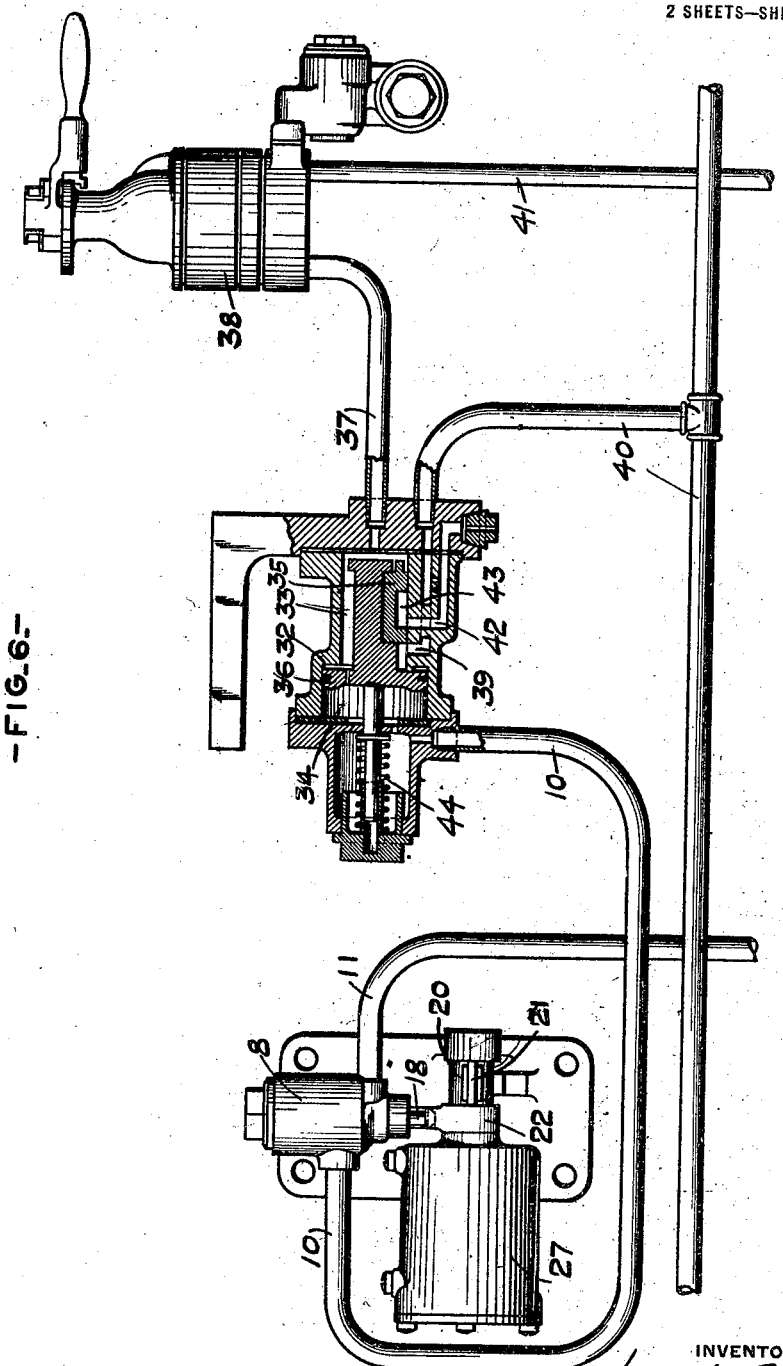

UNITED STATES PATENT OFFICE.

WALTER V. TURNER, OF EDGEWOOD BOROUGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIP-VALVE DEVICE FOR AIR-BRAKES.

1,218,721.  Specification of Letters Patent.  Patented Mar. 13, 1917.

Application filed May 7, 1915. Serial No. 26,489.

*To all whom it may concern:*

Be it known that I, WALTER V. TURNER, a citizen of the United States, and a resident of the borough of Edgewood, in the county of Allegheny and State of Pennsylvania, have invented a certain new and useful Improvement in Trip-Valve Devices for Air-Brakes, of which improvement the following is a specification.

This invention relates to trip valves for air brakes and adapted to be actuated by engaging a track device, usually connected with the signal system, to vent air from the brake system and cause an automatic application of the brakes, when the car or train runs past a signal set at danger.

One of the objects of my invention is to provide an improved valve device which upon being opened to vent air from the system, will remain open a certain length of time sufficient to insure a material reduction in the air pressure to be vented and produce a positive brake application; and another object is to provide an improved trip arm mechanism adapted to be operated in either direction, and having a spring for returning the parts to the normal position.

In the accompanying drawings: Figure 1 is a vertical section of a trip valve device embodying my improvement; Fig. 2, a plan of the same; Fig. 3, a section taken on the line 3—3 of Fig. 1; Fig. 4, a section taken on the line 4—4 of Fig. 1; Fig. 5, a section taken on the line 5—5 of Fig. 1; and Fig. 6, a diagram illustrating the connections of the trip valve and brake application valve to the air brake system.

As shown in Figs. 1 to 5 inclusive, my improved trip valve device comprises a vent valve, 7, contained in a casing, 8, for controlling the discharge of air through ports, 9, from the vent pipe, 10, to the pipe, 11, and the atmosphere. To the valve, 7, is attached the piston, 12, subject on one side to the pressure in the vent pipe tending to open the valve, and on the opposite side to the pressure in the chamber, 13, and to the force of the spring, 14, tending to hold the valve closed. A very small port, 15, leads through the piston to supply air to chamber, 13, which communicates by passage, 16, with escape ports, 17, adapted to be closed when the valve and piston occupy their normal closed positions, but are adapted to be opened to permit the escape of the air pressure from chamber, 13, when the valve is moved to its open position by its stem, 18.

For operating the stem of the vent valve, I provide an improved trip arm mechanism comprising a shaft, 20, having a projecting trip arm, 21, and carrying a double, or heart shaped cam, 22, engaging the end of the valve stem, 18, and adapted to raise the same to open the vent valve when the trip arm is turned in either direction from its normal position. Around the shaft is located a coiled spring, 23, having one end fixed to a collar or disk, 24, loosely mounted on one portion of the shaft, and its other end being fixed to another collar or disk, 25, loosely mounted on another portion of the shaft. The disk, 24, engages a stop or set screw, 26, fixed in the spring casing, 27, for preventing the rotation of the disk, 24, in one direction, and the disk, 25, engages a stop or set screw, 27, also mounted in the casing for preventing the rotation of the disk, 25, in the opposite direction upon the shaft. The disks are provided with the respective projections, 28 and 29, extending toward each other and parallel with the shaft for engaging the respective lugs, 30 and 31, fixed upon the shaft in such a manner that when the trip arm turns the shaft in one direction, one end of the spring with its disk, 24, remains fixed, bearing against one of the set screws, 26, while the other lug, 29, engages the projection, 31, of the other disk, 25, and rotates the same, thus winding up the spring. During this movement, the lug, 30, turns in a direction away from the projection, 28, of disk, 24. When turned in the opposite direction from its normal position, the other end of the spring is held stationary by the disk, 25, bearing against the set screw, 27, while the lug, 30, engages the projection, 28, of the disk 24, and winds up the spring from its opposite end. The spring is thus put under stress by the movement of the shaft in either direction and serves to return the shaft, cam and trip arm to the normal middle position after being operated by contact with an obstruction, or track device, connected to the signal system along the road.

My improved trip valve device is designed to coöperate with a brake application valve of the type having a piston and valve and actuated by a reduction in pressure on one side of the piston to cut off the supply of air to the brake pipe and open a discharge from the brake pipe to the atmosphere to effect an automatic application of the train brakes.

In Fig. 6, I have illustrated one such form of a brake application valve comprising a casing, 32, having a valve chamber, 33, and piston chamber, 34, containing slide valve, 35, and piston, 36. The valve chamber is connected by pipe, 37, with the engineer's brake valve 38, and by port, 39, with the train brake pipe, 40. The pipe, 41, leads from the main reservoir (not shown), to the brake valve. The vent pipe, 10, of the trip valve communicates with the piston chamber, 34. In the normal position of the brake application piston and valve, as shown in the drawing, communication is freely open from the brake valve to the brake pipe through port, 39, and the brake pipe discharge port, 42, is closed.

When the trip arm is actuated, in either direction by engaging a track device, the cam, 22, on the shaft, 20, operates to raise the vent valve, 7, to its open position thereby permitting the air in the vent pipe, 10, to discharge to pipe, 11, and the atmosphere. At the same time the movement of the valve, 7, and piston, 12, opens communication from chamber 13, above the piston through passage, 16, and discharge ports, 17, to the atmosphere. The spring, 23, immediately returns the shaft, 20, with the cam, 22, and trip arm, to the normal position but as the air pressure which had accumulated in piston chamber, 13, through port, 15, is exhausted, the pressure from the vent pipe acting on the under side of piston, 12, maintains the vent valve, 7, in the open position until the pressure in the vent pipe, 10, and in the piston chamber, 34, of the brake application valve is reduced to such a point as to be overcome by the spring, 14, acting to close the vent valve, 7, whereupon the vent valve will be closed. The piston, 36, of the brake application valve is normally balanced as to the brake pipe pressure which equalizes from the valve chamber, 33, into the piston chamber, 34, and the spring, 44, then holds the piston and valve in the normal position shown. When the vent valve is opened the pressure in chamber, 34, at the rear of the piston diminishes much more rapidly than it can be supplied from the valve chamber through the small equalizing port in the piston, and consequently the higher pressure in the valve chamber, 33, immediately moves the piston, 36, and slide valve, 35, to the brake applying position in which the supply of air from the brake valve and pipe, 37, to the brake pipe, 40, is cut off by closing the port, 39, and communication is established from the brake pipe through port, 39, and cavity, 43, in the valve to the discharge port, 42, the reduction in brake pipe pressure causing an application of the automatic brakes in the usual manner.

The vent valve is thus held open a certain length of time required for the pressure in the vent pipe to reduce the desired amount, and as the brake application valve remains open during the same period of time, a sufficient reduction in brake pipe pressure is insured to produce an effective brake application. When the vent valve is closed by its spring, the air from the brake valve pipe which is being supplied through the small equalizing port in piston, 36, restores the pressure in the vent pipe and through small port, 15, in the piston chamber, 13, whereupon the vent valve is held firmly to its seat and the spring, 44, of the application valve returns the piston 36, and valve, 35, to the release position, thus closing the brake pipe discharge port and opening the supply of air from the brake valve to the brake pipe, 40, to effect the release of the brakes in the usual way.

It will thus be seen that my improved vent valve device is entirely automatic in its action, and that the vent valve will in all cases, when operated by the trip arm, be held open a sufficient length of time to insure a positive and effective brake application.

Having now described my invention, what I claim as new and desire to secure by Letters Patent is:

1. A trip valve device for air brakes comprising a vent valve for controlling a discharge of air from a pipe to the atmosphere, a piston connected to said valve and subject on one side to the pressure of said vent pipe, a small port for supplying air from said pipe to the chamber on the opposite side of said piston, a port controlled by the movement of the piston for releasing air from said chamber, and a trip means for opening said vent valve.

2. A trip valve device for air brakes, comprising a vent valve, a piston connected thereto, and subject to air pressure on its opposite sides, a port controlled by the movement of said piston for releasing air from the rear of said piston, a spring acting to close the vent valve, and a trip mechanism for opening said vent valve.

3. In a trip valve device for air brakes, the combination of a vent valve, a shaft having a trip arm, a double cam mounted on said shaft, and connections for operating said valve, and a coiled spring connected at both ends to said shaft for opposing the movement of the trip arm in either direction.

4. In a trip valve device for air brakes, the combination of a vent valve, a shaft having a trip arm and connections for operating said valve, a coiled spring, two collars loosely mounted on said shaft and connected to opposite ends of the spring, stops for said collars, and means for turning one collar by movement of the shaft in one direction, and the other collar by movement of the shaft in the opposite direction.

5. In a trip valve device for air brakes, the combination with a brake application valve, for controlling the supply of air to the brake pipe and a brake pipe discharge, and a piston for actuating said valve, of a vent valve for varying the pressure acting on said piston, a trip mechanism for opening said vent valve, and fluid pressure means for holding said vent valve open a certain length of time.

6. In a trip valve device for air brakes, the combination with a brake application valve, for controlling the supply of air to the brake pipe and a brake pipe discharge, and a piston for actuating said valve, of a vent valve for varying the pressure acting on said piston, a trip mechanism for opening said vent valve, a piston connected to said vent valve, and means governed by the movement of the vent valve for releasing fluid pressure from said vent valve piston.

WALTER V. TURNER.